Patented Dec. 5, 1950

2,532,727

UNITED STATES PATENT OFFICE 2,532,727

PROCESS FOR OBTAINING VINYL CHLORIDE/STYRENE POLYMERS

Arthur W. Larchar, Mendenhall, Pa., assignor to E. I. du Pont de Nemours & Company, Wilmington, Del., a corporation of Delaware No Drawing. Application May 8, 1947, Serial No. 746,880

2 Claims. (Cl. 260—87.5)

This invention relates to polymeric materials and to their preparation.

The preparation of vinyl chloride/styrene polymers under pressure by heating a mixture of vinyl chloride and styrene at gradually increasing temperatures up to 100° C. is described in U. S. Patent 2,012,177. The polymer obtained is described as a whitish, partly pulverulent and partly vitreous mass, soluble in a mixture of acetone and benzene. It is known that in the copolymerization of vinyl chloride with styrene by the ordinary techniques the proportion of styrene in the polymer is always markedly greater than that in the vinyl chloride/styrene monomer mixture. Because of this, it has not heretofore been possible to prepare compositionally homogeneous vinyl chloride/styrene polymers containing high proportions of vinyl chloride.

This invention has as an object vinyl chloride/styrene polymers of valuable properties which contain a high proportion of vinyl chloride. A further object is a method for obtaining these polymers. Other objects will appear hereinafter.

The above objects are accomplished by polymerizing at elevated temperature and under a pressure of at least 3000 atmospheres. a mixture of vinyl chloride and styrene in a mole ratio of at least 6.5 mols of vinyl chloride to one mole of styrene.

The polymerization is best conducted in the presence of a polymerization catalyst which is preferably a free-radical generating compound such as peroxy and azo compounds, oxime, amine oxide, etc., in amount ranging from 0.001% to 5%, and more desirably from .05% to 0.5% by weight of the mixture of monomers. Free oxygen will also serve as the polymerization catalyst, but from the standpoint of better control it is preferred, when using one of the above mentioned compounds as the catalyst, to sweep the reactor free of oxygen with oxygen free nitrogen.

The preferred mode of operation is by the bulk process but, if desired, the reaction can be carried out in the presence of a non-polymerizable organic solvent such as toluene, cyclohexane, etc.

The following examples are illustrative of the practice of this invention. Unless otherwise stated the parts are by weight.

Example I 6.2 parts of styrene, 93.8 parts of vinyl chloride, and 0.07 part of $\alpha,\alpha'$ azodiisobutyronitrile were charged into a pressure vessel. One end of the vessel was fitted with a closure which makes a tight seal when subjected to an internal pressure of several hundred pounds per sq. in. with an external pressure of 1 atm., but which, when subjected to an external pressure in excess of the internal pressure, transmits the higher pressure to the contents of the vessel. The closure consists of a piston having a diameter slightly less than the bore of the vessel attached to a shank of considerably smaller diameter. When subjected to internal pressure only, the piston is supported by a ring of compressible packing backed by a packing gland. The shank is unsupported and extends through a hole in the gland. After filling, the vessel containing the reaction mixture is placed in a larger, heavy walled, heated cylinder containing 90% glycerine as a pressure transmitting fluid. Pressure is built up in this cylinder by means of a hydraulic intensifier and is maintained at 6500–7300 atm. for a period of 18.7 hrs. during which time the temperature is held at 60° C. After release of pressure and removal of unconverted vinyl chloride, 64 parts of copolymer is obtained which contains 51.3% chlorine, which corresponds to 90.3% vinyl chloride. This product is insoluble in benzene and in mixtures of benzene and acetone. Thus, 1 part of the copolymer cannot be dissolved in a mixture of 20 parts of acetone and 20 parts of benzene. The copolymer is readily moulded into clear tough articles and pressed films can be cold-drawn. Mechanical mixtures of polystyrene and polyvinyl chloride, on the other hand, give opaque, extremely brittle mouldings.

Example II 15.2 parts styrene, 84.8 vinyl chloride, 0.07 part $\alpha,\alpha'$ azodiisobutyronitrile are subjected to a pressure of 6600–7300 atm. and a temperature of 70° C. for 18 hours in the equipment described in the preceding example. 78.2 parts of a copolymer containing 47.71% Cl is obtained. This corresponds to a vinyl chloride content of 84.0%. The copolymer is insoluble in benzene, toluene, and in mixtures of benzene and acetone and can be moulded to clear tough articles.

Example III

Seventeen (17) parts of styrene, 224 parts of vinyl chloride, and 0.15 part of benzoyl peroxide are subjected to a pressure of 7300 atm. and a temperature of 65° C. for 16 hours in the equipment described in Example I. One hundred and ninety-four parts of polymer is obtained, analyzing 51.25% chlorine, which corresponds to a vinyl chloride content of 90.4%. The polymer is characterized by being insoluble in benzene, toluene, and mixtures of benzene and acetone, and by yielding clear, tough, molded articles.

The polymers obtained by the practice of this invention are quite distinct from those obtained at low pressures. The latter have a lower chlorine content and are soluble in solvents in which the present polymers are insoluble. For instance, when 78 parts of styrene, 92.2 parts of vinyl chloride and 0.07 part of alpha, alpha'-azodiisobutyronitrile are heated in a closed reactor for 40 hours under autogenous pressure, there is obtained three and nine-tenths parts of copolymer which contains 21.71% chlorine (corresponding to a combined vinyl chloride content of 38.3%), and which is soluble in benzene and mixtures of benzene and acetone.

The reaction can be carried out at temperatures of from 50° C. to 100° C. and is most advantageously conducted at temperatures between 60° C. and 80° C., and under pressures of from 6000 to 7000 atmospheres. The upper pressure, however, is limited only by the apparatus available. Throughout the reaction period the pressure is maintained at the selected point either by the application of external pressure or by injection of more of the vinyl chloride/styrene monomer mixture. After reaction is complete, the reactor is permitted to cool, opened, and the polymer recovered by means well known to those skilled in the art.

The improved polymers described herein are obtained from mixtures containing at least 6.5 moles of vinyl chloride per mole of styrene. Larger proportions of vinyl chloride up to 30 moles of vinyl chloride per mole of styrene can be used, if desired. In general the vinyl chloride to styrene mole ratio employed is in the range of from 8 to 25 moles of vinyl chloride per mole of styrene.

Suitable polymerization catalysts in addition to that mentioned in the examples are alpha, alpha-azo-bis(alpha, gamma-dimethyl valeronitrile) and other compounds containing the —N=N— group, azines, e. g., benzalazine, diphenylketazine, etc., diacyl peroxides, e. g., dibenzoyl peroxide, diacetyl peroxide, dilauroyl peroxide, etc., dialkyl peroxides, e. g., diethyl peroxide, dimethyl peroxide, dibutyl peroxide, etc., hydrazines, e. g., hydrazine hydrochloride, dibenzoyl hydrazine, etc., oximes, acetoneoxime, butyraldoxime, etc., amine oxides, e. g., trimethylamine oxide, etc.

By means of the present invention it is possible to prepare new compositionally homogeneous vinyl chloride/styrene polymers which by chlorine analysis correspond to products containing at least 80% and up to 98% vinyl chloride by weight, and which are insoluble in 25/75 and 50/50 acetone/benzene mixtures and give clear, tough moldings.

As many apparently widely different embodiments of this invention may be made without departing from the spirit and scope thereof, it is to be understood that I do not limit myself to the specific embodiments thereof except as defined in the appended claims.

I claim:

1. A process for obtaining vinyl chloride/styrene polymers which comprises heating at a temperature of from 50° C. to 100° C. in the presence of a polymerization catalyst and under a pressure of at least 3000 atmospheres a mixture of vinyl chloride and styrene in a mole ratio of from 6.5 to 30 moles of vinyl chloride per mole of styrene.

2. A process for obtaining vinyl chloride/styrene polymers which comprises heating at a temperature of from 60° C. to 80° C. in the presence of a polymerization catalyst and under a pressure of from 6000 to 7000 atmospheres a mixture of vinyl chloride and styrene in a mol ratio of from 6.5 to 30 mols of vinyl chloride per mol of styrene.

ARTHUR W. LARCHAR.

REFERENCES CITED

The following references are of record in the file of this patent:

UNITED STATES PATENTS

| Number | Name | Date |
|---|---|---|
| 2,012,177 | Voss et al. | Aug. 20, 1935 |
| 2,151,507 | Fikentscher et al. | Mar. 21, 1939 |
| 2,388,138 | Greenewalt | Oct. 30, 1945 |